(12) United States Patent
Dietz et al.

(10) Patent No.: US 8,464,752 B2
(45) Date of Patent: Jun. 18, 2013

(54) EXTERNAL POSITION INDICATOR OF RAM BLOWOUT PREVENTER

(75) Inventors: David Albert Dietz, Houston, TX (US); Aaron P. Smith, Houston, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 37 days.

(21) Appl. No.: 12/827,459

(22) Filed: Jun. 30, 2010

(65) Prior Publication Data

US 2012/0001101 A1    Jan. 5, 2012

(51) Int. Cl.
  *F16K 37/00* (2006.01)
(52) U.S. Cl.
  USPC .................. 137/556.3; 137/556; 251/1.3
(58) Field of Classification Search
  USPC ............ 251/1.1–1.3; 137/551, 554, 553, 137/556, 556.3, 556.6; 324/207.11–207.26
  See application file for complete search history.

(56) References Cited

U.S. PATENT DOCUMENTS

| 2,302,158 | A | * | 11/1942 | Van Vulpen | 137/553 |
| 2,533,491 | A | * | 12/1950 | McMahon et al. | 251/65 |
| 3,738,116 | A | * | 6/1973 | Gazda | 62/131 |
| 3,744,749 | A | * | 7/1973 | Le Rouax | 251/1.3 |
| 3,918,478 | A | * | 11/1975 | Le Rouax | 137/315.02 |
| 4,147,221 | A | | 4/1979 | Ilfrey et al. | |
| 4,626,135 | A | | 12/1986 | Roche | |
| 5,039,061 | A | * | 8/1991 | Heard et al. | 251/65 |
| 5,103,172 | A | * | 4/1992 | Stoll | 324/226 |
| 5,518,015 | A | * | 5/1996 | Berget et al. | 137/1 |
| 6,102,673 | A | | 8/2000 | Mott et al. | |
| 6,202,753 | B1 | | 3/2001 | Baugh | |
| 6,230,824 | B1 | | 5/2001 | Peterman et al. | |
| 6,325,159 | B1 | | 12/2001 | Peterman et al. | |
| 6,470,975 | B1 | | 10/2002 | Bourgoyne et al. | |
| 6,748,897 | B2 | * | 6/2004 | Enzaki et al. | 116/267 |
| 7,062,960 | B2 | | 6/2006 | Couren et al. | |
| 7,159,669 | B2 | | 1/2007 | Bourgoyne et al. | |
| 7,165,619 | B2 | | 1/2007 | Fox et al. | |
| 7,258,171 | B2 | | 8/2007 | Bourgoyne et al. | |
| 7,497,266 | B2 | | 3/2009 | Fossli | |
| 7,584,796 | B2 | | 9/2009 | Ayling | |
| 2003/0098073 | A1 | * | 5/2003 | Jannotta | 137/553 |
| 2008/0040070 | A1 | * | 2/2008 | McClanahan | 702/158 |

* cited by examiner

*Primary Examiner* — John K Fristoe, Jr.
*Assistant Examiner* — Matthew W Jellett
(74) *Attorney, Agent, or Firm* — Bracewell & Giuliani LLP (57) ABSTRACT

Method and blowout preventer for sealing a well. The blowout preventer includes a body having first and second chambers, the first chamber extending substantially perpendicular to and intersecting the second chamber; a ram block configured to move within the first chamber to seal a first region of the second chamber from a second region of the second chamber; a rod connected to the ram block and configured to extend along the first chamber; a piston connected to the rod and configured to move along and within the first chamber; a bonnet configured to receive the piston, the bonnet being detachably attached to the body; and an indicator device partially mounted outside the bonnet and configured to indicate a physical position of the ram block within the body.

13 Claims, 12 Drawing Sheets

EXTERNAL POSITION INDICATOR OF RAM BLOWOUT PREVENTER

BACKGROUND

1. Technical Field

Embodiments of the subject matter disclosed herein generally relate to methods and systems and, more particularly, to mechanisms and techniques for externally identifying a position of a ram inside a ram blowout preventer.

2. Discussion of the Background

During the past years, with the increase in price of fossil fuels, the interest in developing new production fields has increased dramatically. However, the availability of land-based production fields is limited. Thus, the industry has now extended drilling to offshore locations, which appear to hold a vast amount of fossil fuel.

Figure 1:
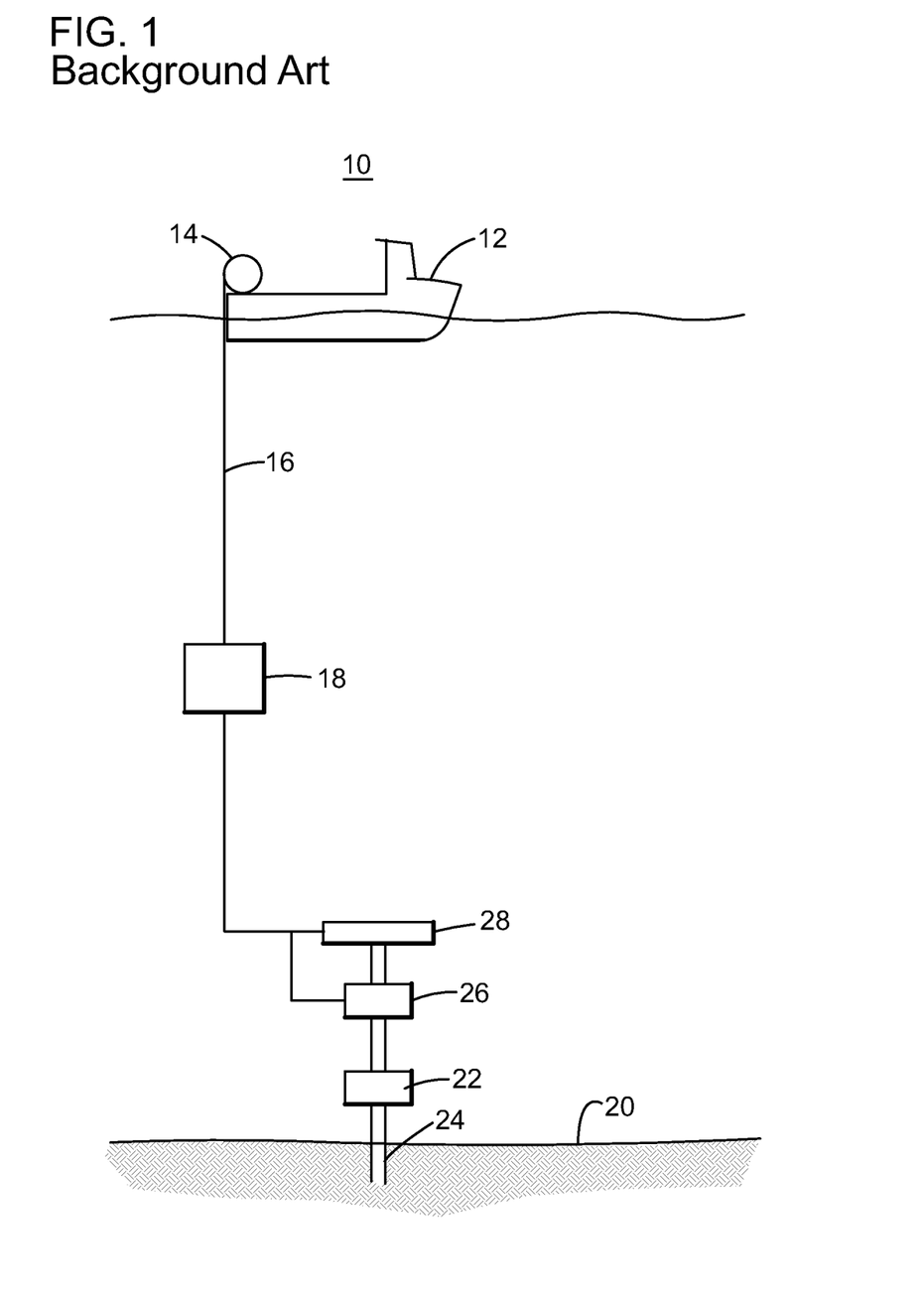
FIG. 1 is a schematic diagram of a conventional offshore rig.

The existing technologies for extracting the fossil fuel from offshore fields use a system 10 as shown in FIG. 1. More specifically, the system 10 includes a vessel 12 (e.g., oil rig) having a reel 14 that supplies power/communication cords 16 to a controller 18. The controller 18 is disposed undersea, close to or on the seabed 20. In this respect, it is noted that the elements shown in FIG. 1 are not drawn to scale and no dimensions should be inferred from FIG. 1.

FIG. 1 also shows a wellhead 22 of the subsea well and a drill line 24 that enters the subsea well. At the end of the drill line 24 there is a drill (not shown). Various mechanisms, also not shown, are employed to rotate the drill line 24, and implicitly the drill, to extend the subsea well.

However, during normal drilling operation, unexpected events may occur that could damage the well and/or the equipment used for drilling. One such event is the uncontrolled flow of gas, oil or other well fluids from an underground formation into the well. Such event is sometimes referred to as a "kick" or a "blowout" and may occur when formation pressure inside the well exceeds the pressure applied to it by the column of drilling fluid. This event is unforeseeable and if no measures are taken to prevent it, the well and/or the associated equipment may be damaged. Although the above discussion was directed to subsea oil exploration, the same is true for ground oil exploration.

Thus, a blowout preventer (BOP) might be installed on top of the well to seal the well in case that one of the above mentioned events is threatening the integrity of the well. The BOP is conventionally implemented as a valve to prevent the release of pressure either in the annular space between the casing and the drill pipe or in the open hole (i.e., hole with no drill pipe) during drilling or completion operations. Recently, a plurality of BOPS may be installed on top of the well for various reasons. FIG. 1 shows two BOPS 26 or 28 that are controlled by the controller 18.

Figure 2:
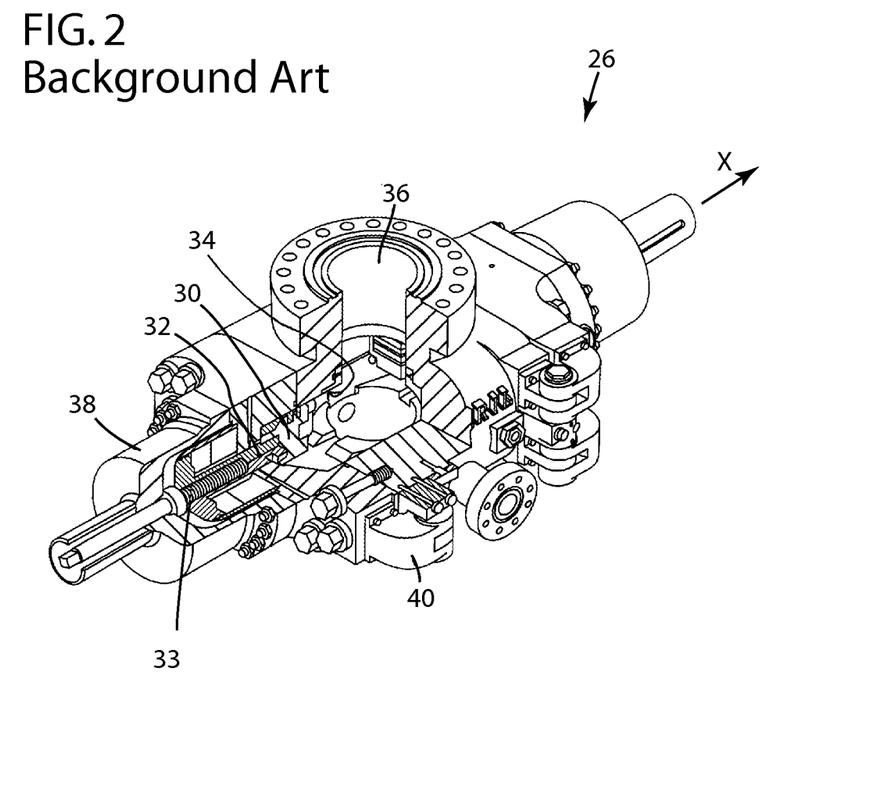
FIG. 2 is a schematic diagram of a traditional BOP.

A traditional BOP may be one to five meters high and may weight tens of thousands of kilograms. Various components of the BOP need to be replaced from time to time. An example of a BOP 26 is shown in FIG. 2. The BOP 26 shown in FIG. 2 has, among other things, two ram blocks 30 that are supported by respective piston rods 32 and a corresponding locking mechanism 33, which is configured to lock the rods 32 at desired positions. The two ram blocks 30 are configured to move inside a first chamber 34 (horizontal bore) along a direction parallel to a longitudinal axis X of the piston rods 32. The ram blocks 30 may severe the drill line 24 or other tools that cross a second chamber 36 (vertical wellbore) of the BOP 26. First and second chambers are substantially perpendicular to each other. However, after cutting the drill line 24 for a number of times (if a shear ram block is installed), the ram blocks 30 and/or their respective cutting edges need to be verified and sometimes reworked. For this reason, the BOP 26 of FIG. 2 is provided with a removable bonnet 38, for each ram block 30, which can be opened for providing access to the ram blocks. FIG. 2 shows the bonnet 38 having a hinge 40 that rotatably opens the bonnet 38.

Figure 3:
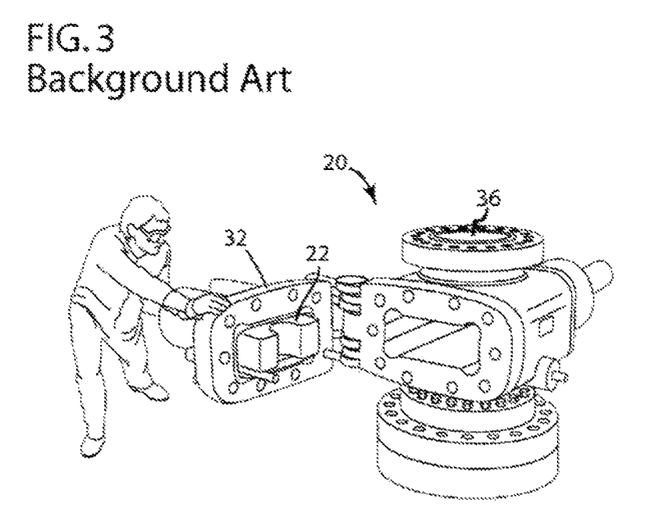
FIG. 3 is a schematic diagram of an opened BOP.

FIG. 3 shows the BOP 26 having the bonnet 38 opened so as to expose the ram block 30. Thus, as can be seen from FIGS. 1 to 3, when the bonnet 38 is closed, the position of the ram block 30 cannot be ascertained. Further, when the BOP is operational, the ram block 30 may have a functional open position and a functional closed position. At least these two positions need to be known by the operator of the BOP.

These positions may be detected as disclosed, for example, in Young et al., Position Instrumented Blowout Preventer, U.S. Pat. No. 5,320,325 (herein Young 1), Young et al., Position Instrumented Blowout Preventer, U.S. Pat. No. 5,407,172 (herein Young 2), and Judge et al., RAM BOP Position Sensor, U.S. Patent Application Publication No. 2008/0196888, the entire contents of which are incorporated here by reference.

These documents disclose a magnetostrictive device for determining the position of the ram block 30 relative to the body of the BOP 26. These devices generate a magnetic field that moves with a piston connected to the ram block and disturbs another magnetic field generated by a wire enclosed by a tube. When this disturbance takes place, a magnetic disturbance propagates as an acoustic wave via the tube to a detector. The time necessary by the magnetic disturbance to propagate to the detector may be measured and used to determine the position of the piston relative to the body of the BOP.

Other techniques for measuring the position of the piston are known, for example, the use of a linear variable differential transformer (LVDT). LVDT is a type of electrical transformer used for measuring linear displacement. The transformer may have three solenoidal coils placed end-to-end around a tube. The centre coil is the primary, and the two outer coils are the secondaries. A cylindrical ferromagnetic core, attached to the object whose position is to be measured, slides along the axis of the tube. An alternating current is driven through the primary, causing a voltage to be induced in each secondary proportional to its mutual inductance with the primary.

As the core moves, these mutual inductances change, causing the voltages induced in the secondaries to change. The coils are connected in reverse series, so that the output voltage is the difference (hence "differential") between the two secondary voltages. When the core is in its central position, equidistant between the two secondaries, equal but opposite voltages are induced in these two coils, so the output voltage is zero.

When the core is displaced in one direction, the voltage in one coil increases as the other decreases, causing the output voltage to increase from zero to a maximum. This voltage is in phase with the primary voltage. When the core moves in the other direction, the output voltage also increases from zero to a maximum, but its phase is opposite to that of the primary. The magnitude of the output voltage is proportional to the distance moved by the core (up to its limit of travel), which is why the device is described as "linear." The phase of the voltage indicates the direction of the displacement.

Because the sliding core does not touch the inside of the tube, it can move without friction, making the LVDT a highly reliable device. The absence of any sliding or rotating contacts allows the LVDT to be completely sealed from its environment. LVDTs are commonly used for position feedback in servomechanisms, and for automated measurement in machine tools and many other industrial and scientific applications.

However, these devices require a continuous source of power for measuring and transmitting the signals corresponding to the position of the ram block. Thus, in case of failure to receive electrical power from the power source, e.g., communication lost with the power source, the well operator is left without any indication about the position of the ram block.

Alternatively, well control operators rely on flow readings of fluid flow through the ram BOP in order to determine ram functionality. For example, a well control operator may fully open a ram BOP, measure the fluid flow through the ram BOP, and compare the measured fluid flow to an expected fluid flow. The well control operator may also fully close a ram BOP and measure whether any fluid flows through the ram BOP. Based on these readings, the positions of the rams in between the open and closed positions may be extrapolated. However, these techniques introduce a certain amount of uncertainty because the expected flow of fluid through the ram BOP may not be accurate. For example, the composition of the fluids flowing through the BOP may change such that measurements taken may be misleading.

Therefore, it is desired to provide a novel BOP for which the position of the ram block can be ascertained by other means than those discussed above.

SUMMARY

According to one exemplary embodiment, there is a blowout preventer for sealing a well. The blowout preventer includes a body having first and second chambers, the first chamber extending substantially perpendicular to and intersecting the second chamber; a ram block configured to move within the first chamber to seal a first region of the second chamber from a second region of the second chamber; a rod connected to the ram block and configured to extend along the first chamber; a piston connected to the rod and configured to move along and within the first chamber; a bonnet configured to receive the piston, the bonnet being detachably attached to the body; and an indicator device partially mounted outside the bonnet and configured to indicate a physical position of the ram block within the body.

According to still another exemplary embodiment, there is an indicator device to be attached to a movable part of a blowout preventer for sealing a well. The indicator device includes a first magnet configured to be attached to a piston within a bonnet of the blowout preventer; an alignment rod configured to be attached to an outside of the bonnet; a second magnet attached to the alignment rod, outside the bonnet, and configured to move along the alignment rod when pushed or pulled by the first magnet; and a scale provided on the outside of the bonnet such that a position of the second magnet relative to the scale is indicative of the position of a ram block inside the blowout preventer.

According to yet another exemplary embodiment, there is an indicator device to be attached to a movable part of a blowout preventer for sealing a well. The indicator device includes a tail-rod extension configured to be connected to the movable part of the blowout preventer and configured to move through a bonnet of the blowout preventer; a seal disposed between the tail-rod extension and the bonnet for maintaining a pressure difference between an inside and outside of the bonnet; and a visual indicator provided on the tail-rod extension, outside the bonnet, and configured to indicate a position of the movable part.

According to another exemplary embodiment, there is a method for attaching an indicator device to a movable part of a blowout preventer. The method includes forming a hole in a bonnet of the blowout preventer; attaching a rod to the movable part of the blowout preventer such that the rod enters the hole of the bonnet and part of the rod is inside the bonnet and part of the rod is outside the bonnet; disposing a seal between the rod and the bonnet to maintain a pressure difference between an inside and outside of the bonnet; and providing a visual indicator on the part of the rod that is outside the bonnet to indicate a position of the movable part inside the blowout preventer.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a ram BOP provided on top of a well head undersea. However, the embodiments to be discussed next are not limited to these systems, but may be applied to other BOPS that may be used, for example, inland.

Reference throughout the specification to "an exemplary embodiment" or "another exemplary embodiment" means that a particular feature, structure, or characteristic described in connection with an embodiment is included in at least one embodiment of the subject matter disclosed. Thus, the appearance of the phrases "in an exemplary embodiment" or "in another exemplary embodiment" in various places throughout the specification is not necessarily referring to the same embodiment. Further, the particular features, structures or characteristics may be combined in any suitable manner in one or more embodiments.

Figure 4:
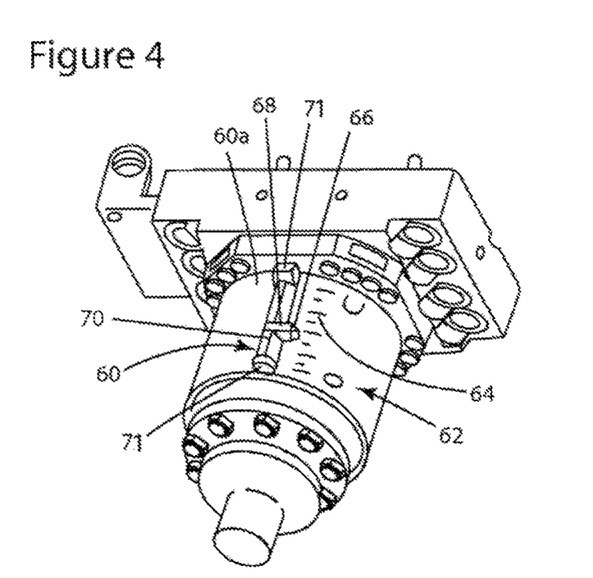
FIG. 4 is a schematic diagram of a bonnet of a BOP having an indicator device according to an exemplary embodiment.

According to an exemplary embodiment, a new or an existing blowout preventer (BOP) may be configured to provide an external indicator that is indicative of a position of the ram block More specifically, as shown in FIG. 4, a bonnet 60 of a BOP is illustrated having an indicator device 62. The indicator device 62 may include one or more components as discussed next. It is noted that the indicator device 62 has at least some components provided on an outside surface 60a of the bonnet 60. FIG. 4 shows a scale 64 provided, for example, directly on the outside of the bonnet 60. A marker 66 moves relative to the scale 64 for indicating the physical position of the ram block inside the body of the blowout preventer. The marker 66 may be attached, for example, to an outside magnet 68. The external magnet 68 ma move, for example, along an alignment rod 70. The alignment rod 70 is fixed to the outside of the bonnet 60 by, for example, two supports 71. Other connections and/or components may be used to indicate the position of the ram block relative to the scale 64 as would be appreciated by those skilled in the art. For example, the marker 66 may be part of the external magnet 68. The marker 66, rod 70, and supports 71 may be made of stainless steel, corrosion resistant materials, plastics, composite materials, etc.

Figure 5:
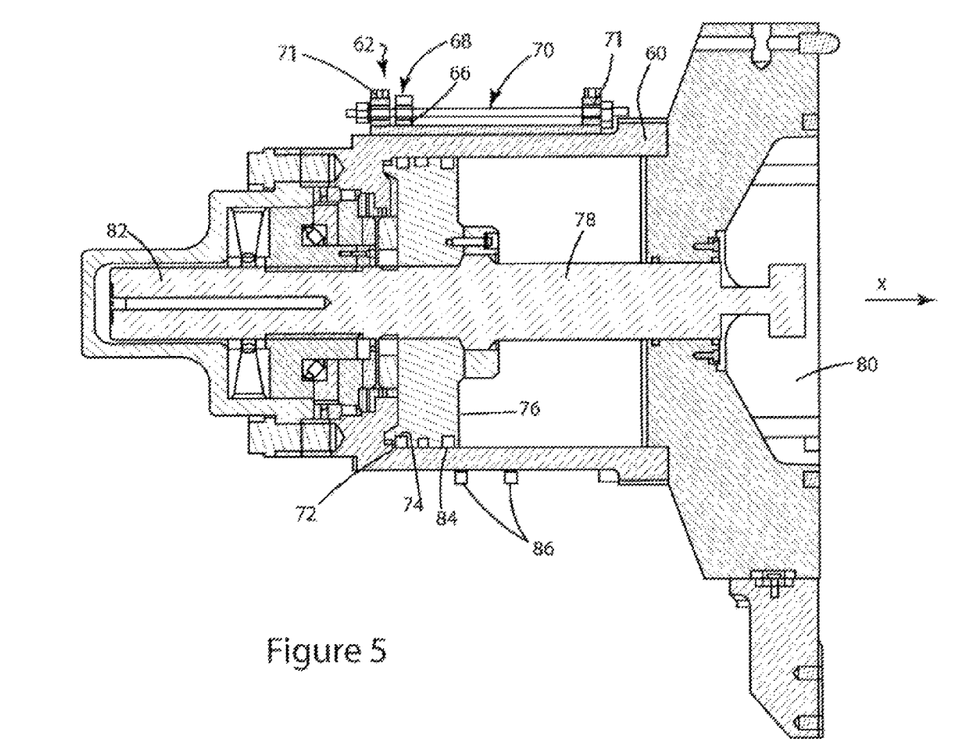
FIG. 5 is a schematic diagram of an indicator device mounted on a bonnet of a BOP according to an exemplary embodiment.

According to an exemplary embodiment illustrated in FIG. 5, the indicator device 62 may also include an internal magnet 72. The internal magnet 72 may be disposed in a groove 74 formed in a piston 76. Piston 76 is connected via a rod 78 to a ram block 80. It is noted that piston 76 may be provided inside bonnet 60 and piston 76 is configured to move along axis X for actuating or retrieving the ram block 80. Mechanisms for moving piston 76 inside the bonnet 60 are known in the art and are not repeated herein. In one embodiment, a piston tail 82 may be attached to the piston 76 or rod 78.

Figure 6:
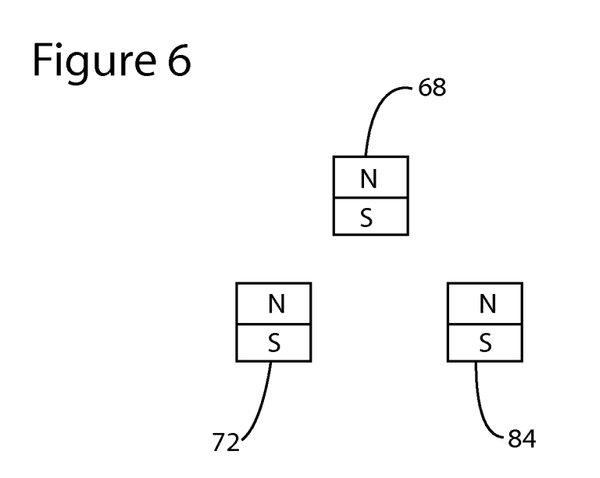
FIGS. 6 and 7 are schematic diagrams illustrating possible magnet distributions for an indicator device according to an exemplary embodiment.
Figure 7:
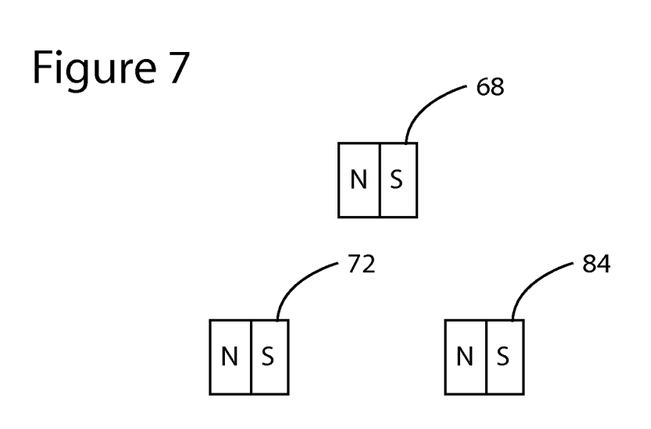

In still another exemplary embodiment, a second internal magnet 84 may be provided in a corresponding groove in piston 76. First and/or second internal magnets 72 and 84 may be configured to fully circle a periphery of the piston 76. However, according to another exemplary embodiment, the first and/or second internal magnets may only partially extend around the piston 76. The internal magnet 72 and the external magnet 68 are sized in such a way that a movement of the internal magnet 72 induces a movement of the external magnet 68. When the second internal magnet 84 is also present, the polarity of the three magnets 68, 72 and 84 may be arranged as shown in FIG. 6 such that both internal magnets 72 and 84 pull or push the external magnet 68. FIG. 7 shows another possibility for arranging the polarity of the magnets. Those skilled in the art would recognize that other combinations are also available, e.g., with multiple polarities.

Although FIG. 5 shows the external magnet 68 connected to alignment rod 70 and the alignment rod 70 being supported by two supports 71, it is noted that other arrangements may be used for providing the external magnet 68 on a sliding path along axis X of the bonnet 60. For example, only one support 71 may be used instead of two supports 71.

Figure 8:
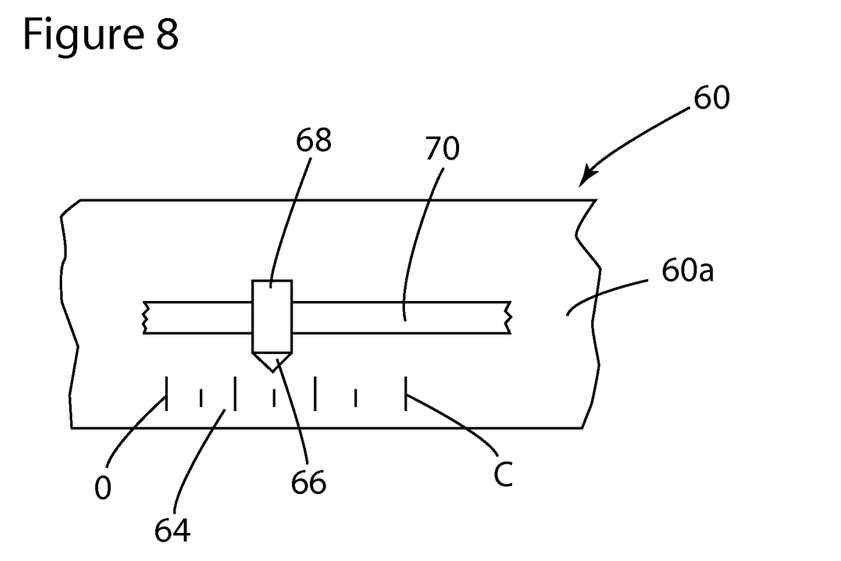
FIG. 8 is a schematic diagram of a scale of an indicator device according to an exemplary embodiment.

According to an exemplary embodiment shown in FIG. 8, the scale 64 is provided on the bonnet 60 either by being engraved on the bonnet 60 or by being attached with bolts to the bonnet or by being painted or by other mechanisms. Irrespective of the method of providing the scale 64 on the bonnet 60, a closed position C and an open position O may be indicated on the scale. As the scale 64 and the marker 66 are provided on the outside surface 60a of the bonnet 60, the operator of the BOP may visually determine the position of the ram block by monitoring the marker 66. For example, when the BOP is deployed undersea, a remote operated vehicle (ROV) may be used to carry a camera and directly determine the position of the ram block. This is advantageous when the communication with the BOP fails. Under these circumstances, the operator may send the ROV to quickly identify whether the BOP has closed or not.

Returning to FIG. 5, two sensors 86 may be added to the bonnet 60 (inside or outside) for detecting a moving direction of the piston 76. For example, the sensors may be configured to sense the internal magnet 72. By sensing with two sensors the internal magnet 72, the movement direction of the piston 76 may be determined, supposing that power is available to the sensors and the communication with the sensors is not lost. Other sensors or devices may be used to determine the movement direction of the piston 76.

Figure 9:
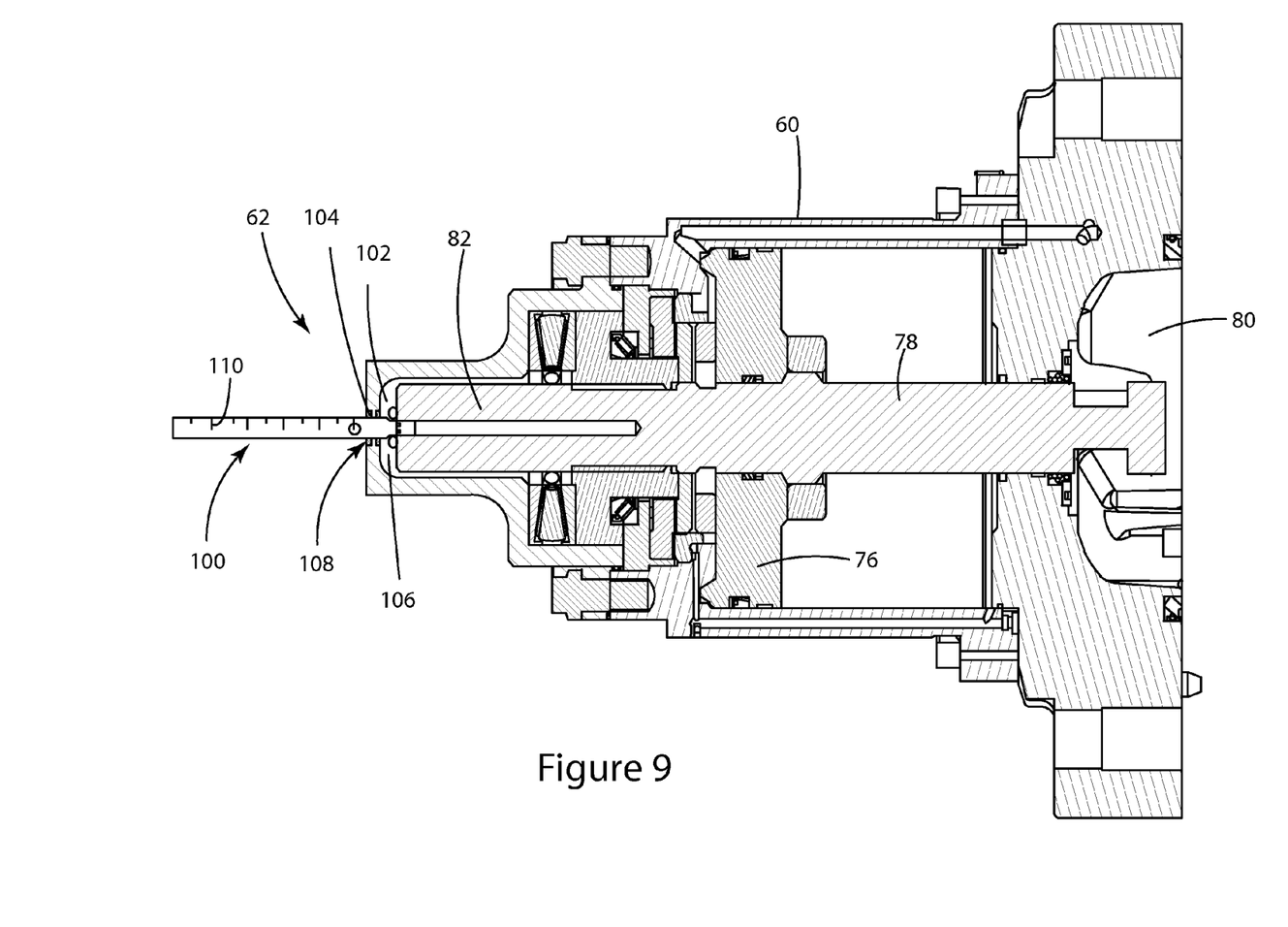
FIG. 9 is a schematic diagram of another indicator device according to an exemplary embodiment.

According to another exemplary embodiment illustrated in FIG. 9, an indicator device 62 may include a tail-rod extension 100 that is configured to be attached to the piston tail 82. The tail-rod extension 100 may be attached to an existing bolt pattern 102 that is present on the piston tail 82 (e.g., piston tail 82 may have the bolt pattern 102 for receiving a magnetostrictive device (not shown) that is configured to determine a position of the piston 76). Alternatively, an existing BOP may be modified to receive the bolt pattern 102.

The tail-rod extension 100 is configured to exit through the bonnet 60 via a hole 104 formed in the bonnet. In order to prevent a fluid from passing from enclosure 106 to the ambient or vice versa, a seal 108 may be provided between the bonnet 60 and the tail-rod extension 100. The seal 108 may be a static or dynamic seal and may be configured to maintain a pressure difference between an inside and outside of the bonnet.

The embodiment illustrated in FIG. 9 also includes a scale 110 formed (or attached) to the tail-rod extension 100. The scale 110 is so calibrated to indicate the position of the ram block 80 inside the body of the BOP. In another application, the tail-rod extension 100 may be attached to another moving component of the BOP, off-center to a central axis of the bonnet, as will be discussed later.

Figure 10:
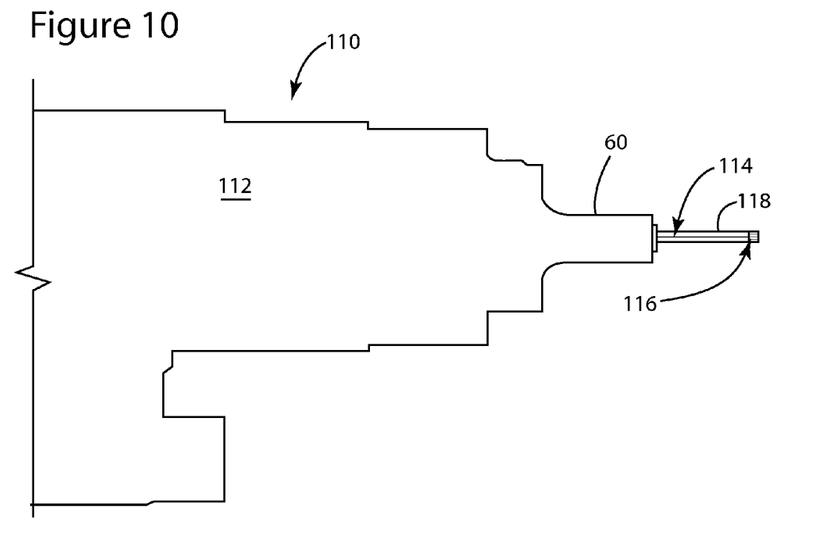
FIGS. 10 and 11 are schematic diagrams of a tail-rod indicator device according to an exemplary embodiment.
Figure 11:
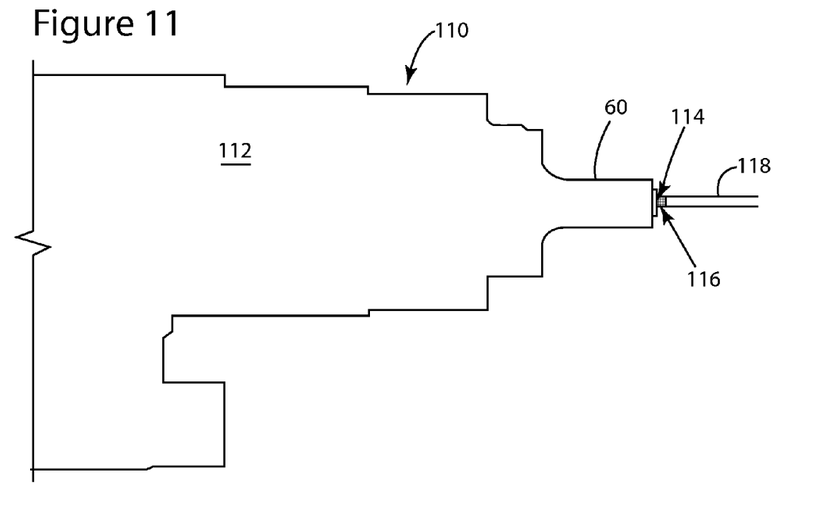
Figure 14:
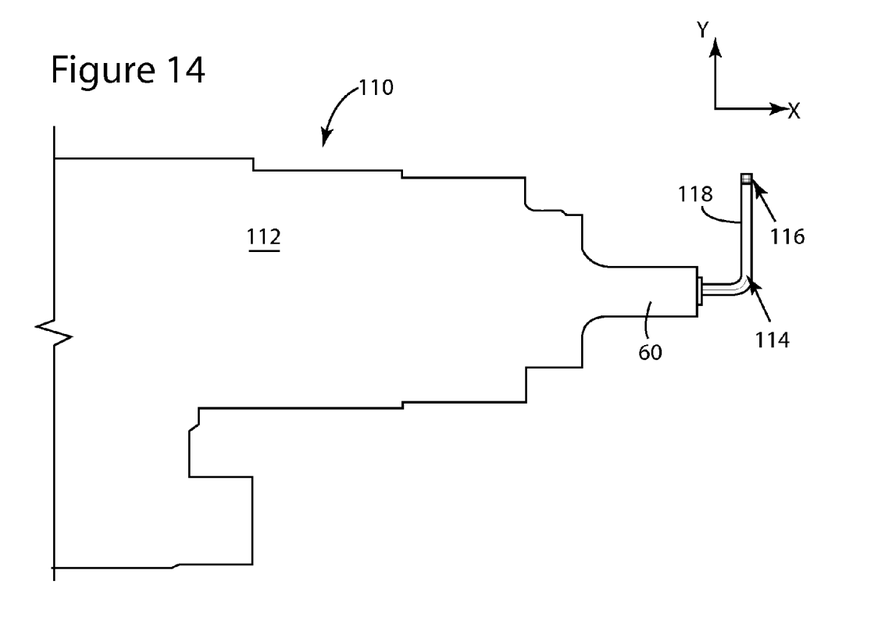
FIGS. 14 and 15 are schematic diagrams of a bent indicator device according to an exemplary embodiment.
Figure 15:
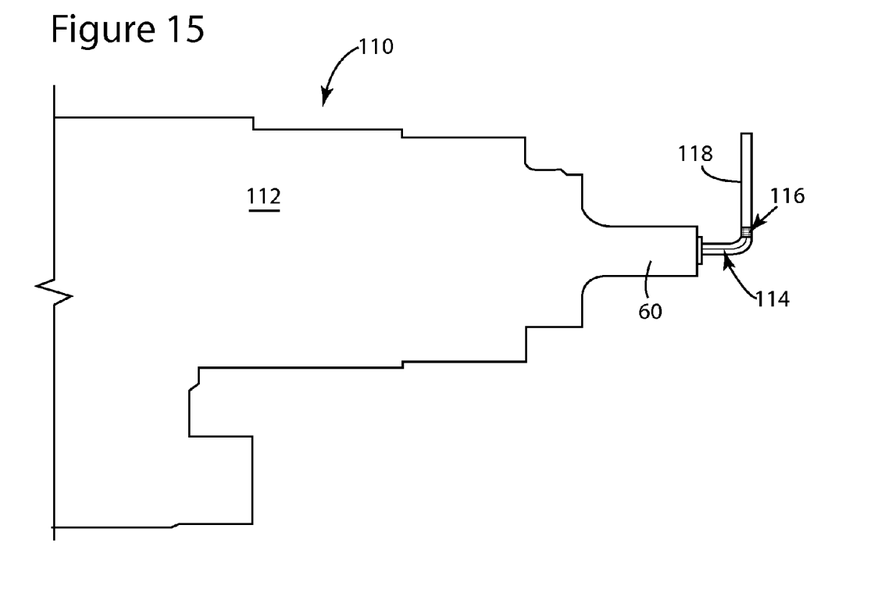

However, according to another exemplary embodiment illustrated in FIGS. 10 and 11 another type of marker may be implemented as discussed next. These figures show a BOP 110 having a body 112. A rod 114 (solid rod, flexible wire, etc.) may be attached to a moving part of the BOP (e.g., piston or tail-rod). Thus, the rod 114 moves unitarily with the moving part of the BOP. A marker 116 may be attached to the rod 114 in such a way that a position of the marker 116 indicates a closed, opened or in between position of the ram block 80. Both the rod 114 and the marker 116 may be provided in a partially transparent tube 118. The partially transparent tube may be totally transparent, e.g., made of glass of plastic, or may have a longitudinal strip that is transparent. The tube 118 may be straight as shown in FIGS. 10-13 or curved as shown in FIGS. 14 and 15. If the space available for the BOP is limited, the curved tube 118 of FIGS. 14 and 15 may be used. In addition, tube 118 may be closed or opened as also shown in FIGS. 10 and 11.

The marker 116 being disposed outside the BOP 110, a ROV may be used to directly read the position of marker 116 such that even when the BOP has failed, the position of the ram block 80 may be determined. For this reason, the tube 118 is partially or totally transparent. In this regard, FIG. 10 shows a situation when the ram block 80 is open and FIG. 11 shows the ram block being closed. Other mechanical, thermal, etc. means may be used to indicate the position of the ram block 80 as long as a reading of the position is possible from outside the BOP by either direct visual contact or video contact.

Figure 12:
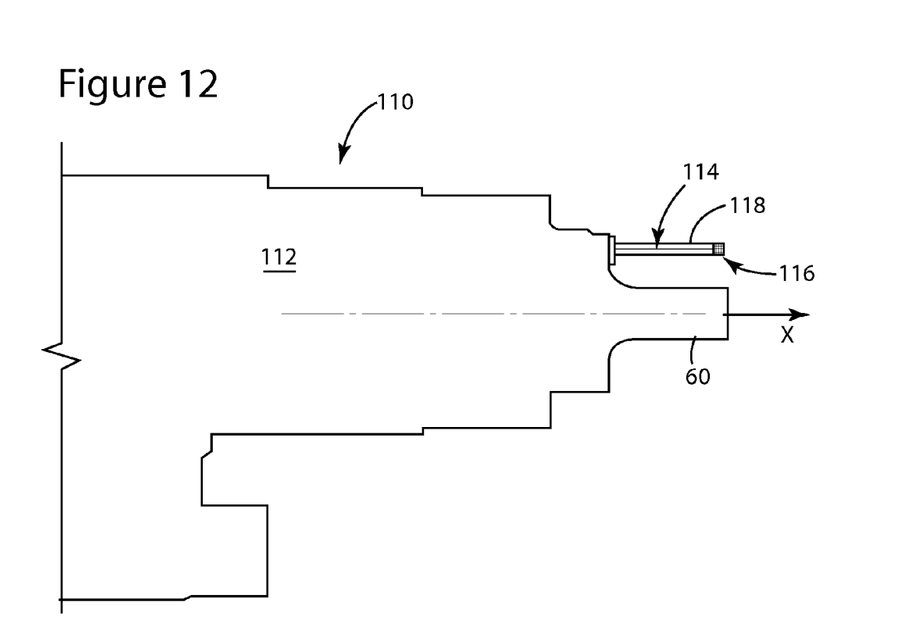
FIGS. 12 and 13 are schematic diagrams of an off-center indicator device according to an exemplary embodiment.
Figure 13:
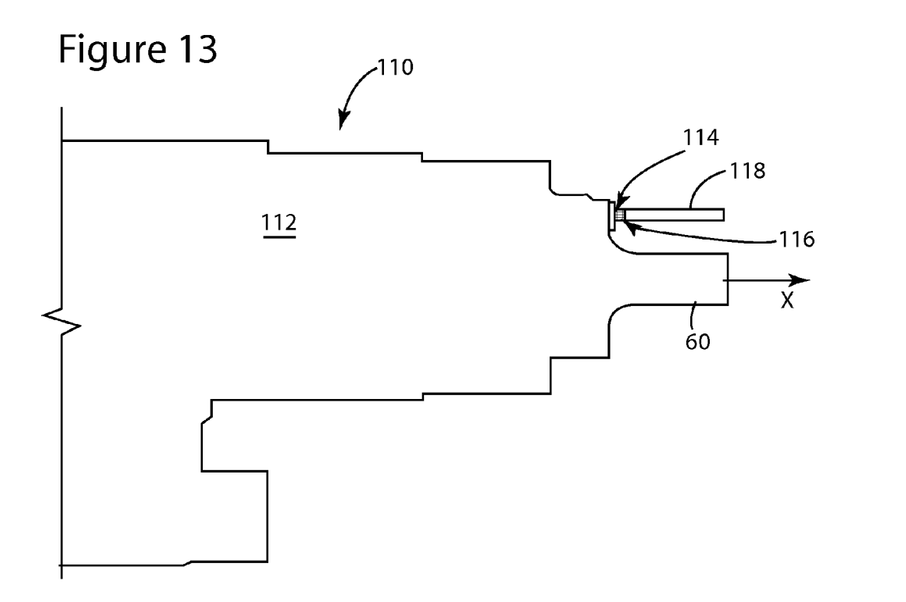

FIGS. 12 and 13 are similar to FIGS. 10 and 11 but indicate that the rod 114 and marker 116 are off-center of a central axis X of the bonnet 60. FIGS. 14 and 15 illustrate a different embodiment in which the rod 114 is not straight as in FIGS. 10-13 but is bent when exiting the bonnet 60 in order to reduce a horizontal foot-print of the BOP. In this case, rod 114 is a flexible wire that can easily bend to follow a given profile of tube 118. FIGS. 14 and 15 show that the rod 114 is configured to bend when exiting the bonnet 60 and change a motion direction from a first direction (X) to a second direction (Y) that is substantially perpendicular on the first direction.

As those skilled in the art would understand, the novel indicator device that has external components that are visible from outside the BOP may be retrofitted to the existing BOP or may be manufactured together with the new BOP. These indicator devices may be used when the BOP has failed, or when the communication with the BOP has failed or is unreliable, or when the operator intends to calibrate the mechanical or electrical devices that produce the position of the ram block, etc.

Figure 16:
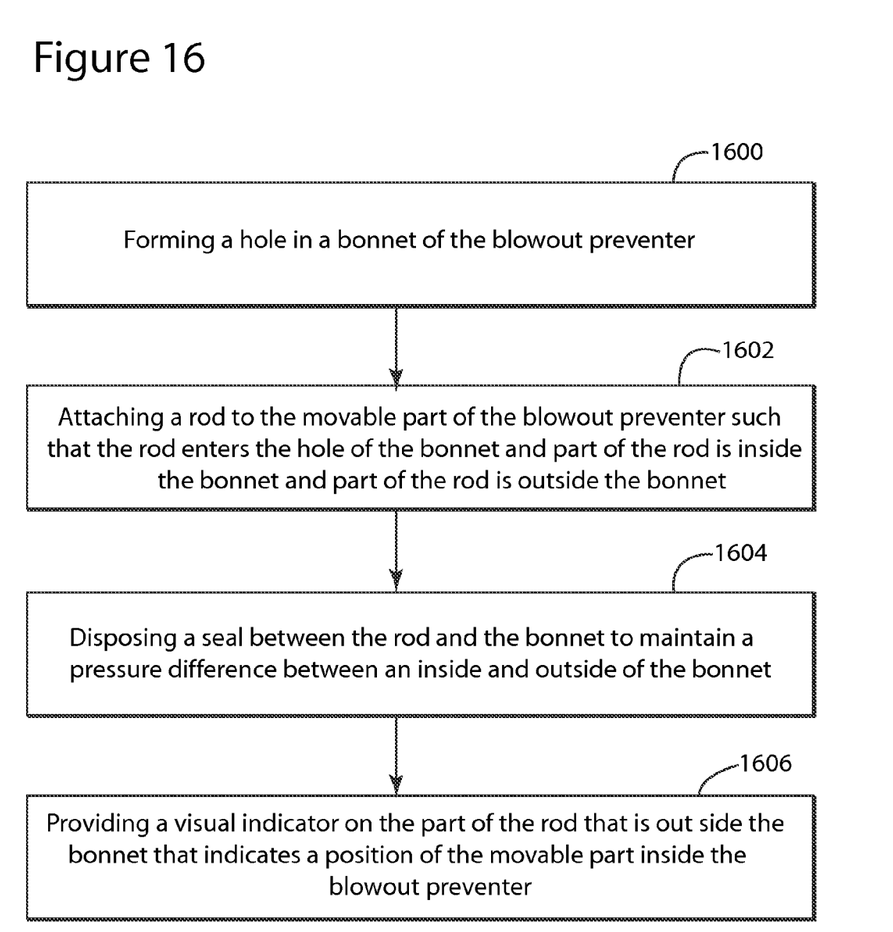
FIG. 16 is a flow chart illustrating a method for attaching an indicator device to a BOP according to an exemplary embodiment.

According to an exemplary embodiment illustrated in FIG. 16, there is a method for attaching an indicator device to a movable part of a blowout preventer. The method includes a step 1600 of forming a hole in a bonnet of the blowout preventer; a step 1602 of attaching a rod to the movable part of the blowout preventer such that the rod enters the hole of the bonnet and part of the rod is inside the bonnet and part of the rod is outside the bonnet; a step 1604 of disposing a seal between the rod and the bonnet to maintain a pressure difference between an inside and outside of the bonnet; and a step 1606 of providing a visual indicator on the part of the rod that is outside the bonnet that indicates a position of the movable part inside the blowout preventer.

The disclosed exemplary embodiments provide an indicator device and a method for indicating a position of a ram block inside a BOP. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A blowout preventer for sealing a well, the blowout preventer comprising:

a body having first and second chambers, the first chamber extending substantially perpendicular to and intersecting the second chamber;

a ram block selectively moveable from within the first chamber to the second chamber to define a seal in the second chamber;

a connecting rod connected to the ram block and configured to extend along the first chamber; a piston connected to the connecting rod and configured to move along and within the first chamber and move the ram block in and out of the second chamber;

a bonnet configured to receive the piston, the bonnet being detachably attached to the body;

an indicator device having at least a portion disposed outside the bonnet when the ram block is in the first chamber and in the second chamber, and configured to indicate where the ram block is within the body; and a third magnet are disposed at an end of the piston opposite the first magnet and along an axis of the first chamber, with the second magnet between the first and third magnets, so that when the piston moves within the bonnet, the first magnet and third magnet move the second magnet to indicate a position of the ram.

2. The blowout preventer of claim 1, wherein the indicator device comprises:

a first magnet attached to the piston within the bonnet;

an alignment rod attached to an outside of the bonnet; and a second magnet provided outside the bonnet and configured to move along the alignment rod together with the first magnet.

3. The blowout preventer of claim 2, further comprising:

a scale provided on the outside of the body such that a position of the second magnet relative to the scale is indicative of the position of the ram block inside the body.

4. The blowout preventer of claim 2, further comprising:

two sensors provided outside the bonnet, each sensor configured to detect a presence of the first or second magnet next to the sensor such that a movement direction of the ram block is determined.

5. The blowout preventer of claim 2, wherein the first magnet is a circular magnet disposed at a periphery of the piston.

6. The blowout preventer of claim 1, wherein the indicator device comprises: a tail-rod extension connected to the piston and configured to exit the bonnet; and a seal disposed between the tail-rod extension and the bonnet for maintaining a pressure differential between an inside and outside of the bonnet.

7. The blowout preventer of claim 6, wherein the tail-rod extension includes marks that indicate the position of the ram block inside the body.

8. The blowout preventer of claim 6, further comprising: a marker attached to the tail-rod extension and configured to indicate a position of the ram block inside the body.

9. The blowout preventer of claim 6, further comprising: a tube having partially transparent sidewalls and that is attached to the bonnet and configured to receive the tail-rod extension, wherein the tail-rod extension is configured to bend when inside the tube and outside the bonnet.

10. The blowout preventer of claim 6, wherein the tail-rod extension is located off-center relative to a central axis of the bonnet.

11. A blowout preventer for sealing a well comprising:

a body having first and second chambers, the first chamber extending substantially perpendicular to and intersecting the second chamber;

a ram block selectively moveable from within the first chamber to the second chamber to define a seal in the second chamber;

a connecting rod connected to the rain block and configured to extend along the first chamber; a piston connected to the connecting rod and configured to move along and within the first chamber and move the ram block in and out of the second chamber, a bonnet configured to receive the piston, the bonnet being detachably attached to the body;

an indicator device having at least a portion disposed outside the bonnet when the ram block is in the first chamber and in the second chamber, and configured to indicate where the ram block is within the body that is indicative of the position of the ram block inside the body, a scale on an external surface of the body, and an indicator that moves with movement of the ram adjacent the scale for representing a location of the ram such that the at least one component is visible from the outside of the body.

12. An indicator device to be attached to a movable part of a blowout preventer for sealing a well, the indicator device comprising:

a first magnet configured to be attached to a piston within a bonnet of the blowout preventer;

an alignment rod configured to be attached to an outside of the bonnet;

a second magnet attached to the alignment rod, outside the bonnet, and configured to move along the alignment rod when pushed or pulled by the first magnet;

a scale provided on the outside of the bonnet such that a position of the second magnet relative to the scale is indicative of the position of a ram block inside the blowout preventer; and a third magnet disposed on the piston axially spaced apart from the first magnet, so that when the second magnet is axially between the first magnet and the third magnet, the first magnet and the third magnet each move the second magnet in response to movement of the ram.

13. The indicator device of claim 12, further comprising: two sensors provided outside the bonnet, each sensor configured to detect a presence of the first or second magnet next to the sensor such that a movement direction of the ram block is determined.

* * * * *